March 11, 1952  J. L. CAMPBELL  2,588,960
COFFEE DISPENSER

Filed Nov. 22, 1948  3 Sheets-Sheet 1

INVENTOR.
JACKSON L. CAMPBELL,
BY
Justin C. Macklin
ATT'Y

INVENTOR.
JACKSON L. CAMPBELL,
BY
Justin L. Macklin,
ATTY

Patented Mar. 11, 1952

2,588,960

UNITED STATES PATENT OFFICE 2,588,960

COFFEE DISPENSER

Jackson L. Campbell, Cleveland, Ohio

Application November 22, 1948, Serial No. 61,397

5 Claims. (Cl. 222—185)

This invention relates to dispensers of that nature comprising a container for loose material, such as coffee, and a manually operated device for discharging a measured amount of material from the container upon the simple movement of an actuating means.

The general object of the invention is to provide a simple effective device which shall be uniformly operative for repeatedly discharging measured amounts and which shall be simple in construction, capable of being cheaply manufactured, durable in use, and easy to operate.

A more specific object is to provide such a dispenser that it shall be particularly adapted for ground coffee, and which upon the actuation of a single lever may discharge the coffee into a suitable container, such as a cup or the top of a percolator, and in amounts which will have a relation to the desired number of cups of coffee to be made.

Still another important object is to so construct the measuring and discharging device that it shall prevent clogging due to packing of the coffee grounds or other loose material. It shall have a minimum number of parts and be capable of operation by the simple swinging movement of a single actuating lever.

My present discharge device comprises a plurality of compartments arranged around a center with oscillating cover and bottom disks for the compartments, and a unique mechanical lever arrangement connected with each of the oscillating members, such that one closure member may be moved to open and close while the other is held in its closed position, of the single lever in one direction, and upon a return swinging movement of the same lever may reverse the opening and closing and the holding of the upper and lower closure members.

Other objects will become apparent in the following specification which refers to the accompanying drawings, showing a preferred embodiment of my invention.

In the drawings, Fig. 1 is a vertical axial section through a container and the measuring and discharging device fitted at the lower portion thereof;

Figure 1:
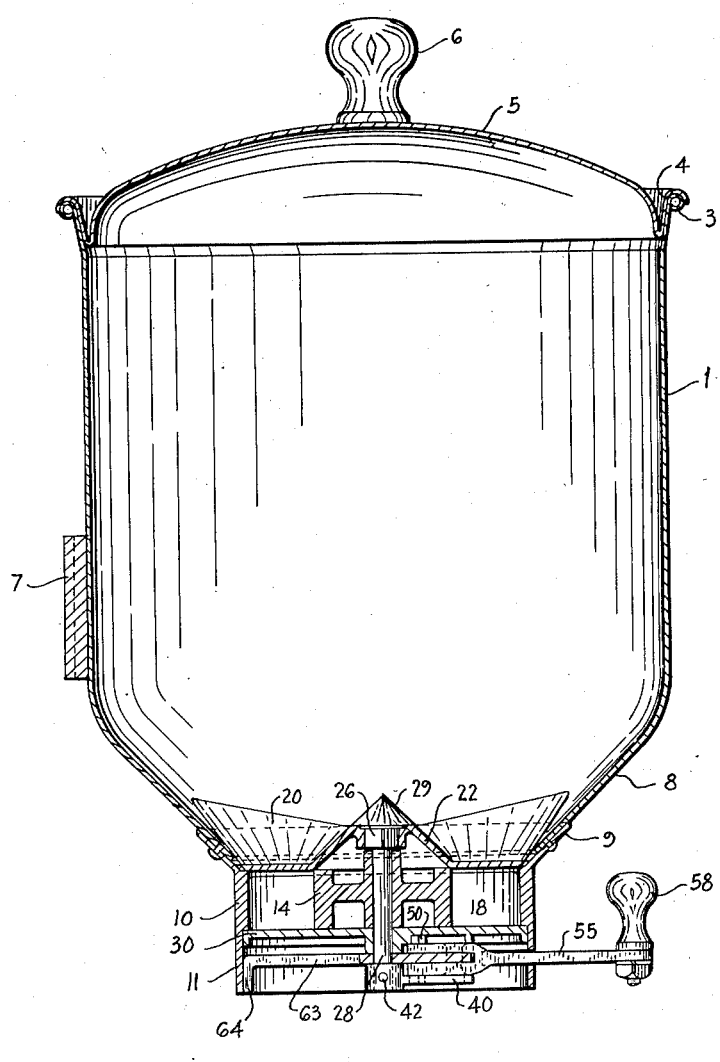
Figure 2:
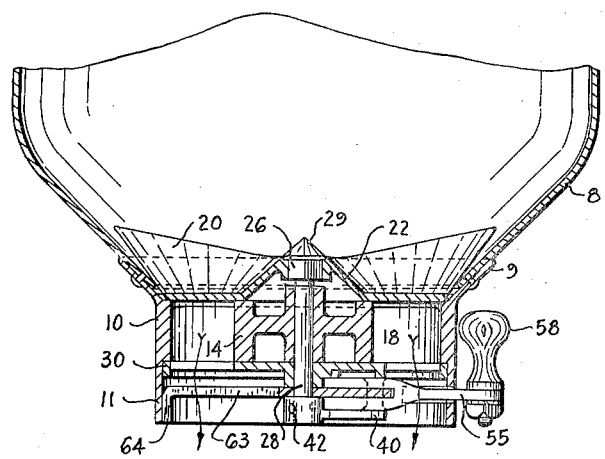
Fig. 2 is a similar section omitting the upper portion of the container and showing the dispensing parts in a position of discharging from the measuring compartments.
Figure 3:
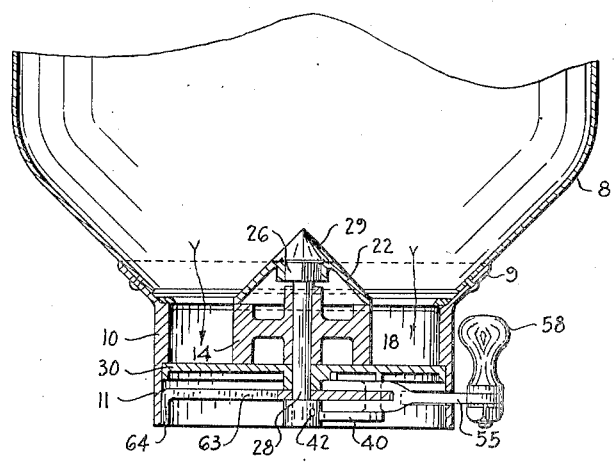
Fig. 3 is a similar sectional view showing the parts in position to admit material into the measuring compartments.
Figure 4:
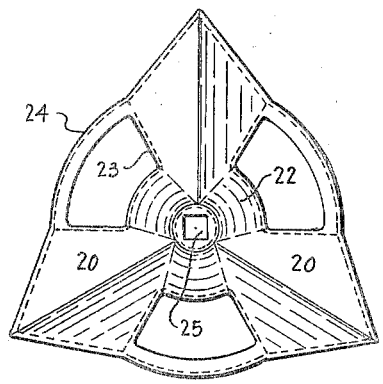
Fig. 4 is a plan view of the upper closure plate.
Figure 5:
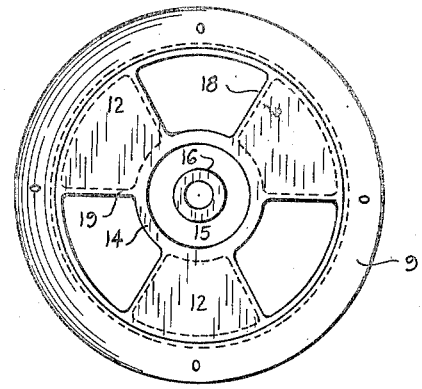
Fig. 5 is a plan view of the measuring compartment member.

In the form illustrated, I have shown my novel metering and discharging mechanism as attached to a container of suitable size for a given amount, say, a pound or two of coffee.

It should be borne in mind that the invention is adaptable for accurately measuring and discharging various kinds of loose material, and may be modified to suit the size and nature of material, and may be put to many uses, of which the coffee dispenser shown is an illustration.

Referring to the drawings, a material container 1 is shown as cylindrical and as having a cover-receiving rim 3 into which is fitted the flange 4 of a cover 5, shown as having a handle knob 6.

The container may be attached to the wall in any suitable fashion, as by dove-tail brackets, and the like. At 7 is indicated a supporting member rigidly secured to the wall of the container for such a support.

The lower end of the container is sloped inwardly at 8 and fits inside of a flange 9 formed on the upper portion of the measuring compartment member 10. This member 10 is shown as having a cylindrical outer surface, inwardly extending sectors 12 united with a circular wall 14 within which a web 15 supports a hub or bearing 16. Between the sectors 12 are arcuate measuring compartments 18 having concentric inner and outer wall surfaces and radial side wall surfaces formed on downwardly extending wall members 19 of the sectors 12.

The angle between the radial walls 19 is preferably about sixty degrees, and the size of these compartments may be determined to suit the purpose for which the measuring dispenser is to be used.

The upper surfaces of the sectors 12 are preferably horizontal and smooth, and closely fitted, and rotatable thereon is a closure member comprising three closure portions 20 having sloping surfaces meeting along radial ridges and merging with a conical center hub member 22, and joined by arcuate members 24 riding on a shoulder formed inside of the flange 9 while the conical hub portion is of approximately the same diameter as the circular wall member 14 below it, and as will be seen the surfaces of the members 20 and of the hub portion 22 slope downwardly to the measuring compartments 18.

The hub portion is provided with a central member having a square opening 25 adapted to receive a square head portion 26 of a shaft 28. Above the squared portion the shaft is provided with a conical tip 29 to continue the conical downward slope of the surface of the hub portion 22.

The measuring compartments are closed at the bottom by a horizontal, rotatable disk-like member 30 having a hub portion 31 loosely embracing the shaft 28 and having a flanged rim 32 fitted into an offset portion of the wall of the member 10, and tightly but slidably fitted against the surfaces of the circular member 14 and walls 19 forming the compartments 18, thus tightly but movably fitted into a position to close and form the bottom of the measuring compartments, while arcuate openings 35 in the disk-like member may, when the disk is moved approximately sixty degrees, register with these openings and permit the material to be discharged.

For alternately rotating the upper and lower closure members 20 and 30, I have provided a simple cam and lever arrangement by which the movement of these closure members in opposite directions may be effected. The unique arrangement is such that the one closure member remains stationary and closed, while the other moves to both open and close.

Affixed to the bottom of the shaft 28 is an arm 40 having a hub 41 which may be secured, as by a pin 42, and which is provided with a cam slot having an arcuate dwell portion 43 and a radial or active portion 44.

Rigid with and preferably die-cast on the closure disk member 30 is a counterpart of the cam arm 40, indicated at 45, and provided with an arcuate dwell portion of a cam slot 46 and a radial active portion 47.

Coacting with these cam slots are swingable projections 50 and 51 carried on short lever arms 52 and 53 formed as bifurcated extensions of the operating offset lever arm 55 pivoted at 56 on a supporting member 60. This supporting member is shown as a three-arm bracket having portions 62 and 63 extending to the downward extension or skirt 11 of the measuring compartment member 10 and suitably secured thereto, as by rivets through the downturned ends 64 and 65.

The offset lever 55 preferably carries a suitable operating handle 58 secured thereon through an opening 59 through the outer end of the handle lever.

It will be seen that the cam actuating projections 50 and 51 are carried at an equal distance from the fixed pivot 56, and being rigidly formed on the actuating handle lever, they will be swung together through arcs of equal length consequent upon movement of the handle.

Figure 11:
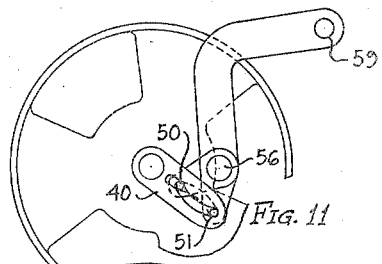
Figs. 10, 11 and 12 are diagrammatic views taken as though looking upwardly from the bottom of the discharging mechanism illustrating the three positions of the actuating lever and the co-acting cams for moving the upper and lower closure members.
Figure 6:
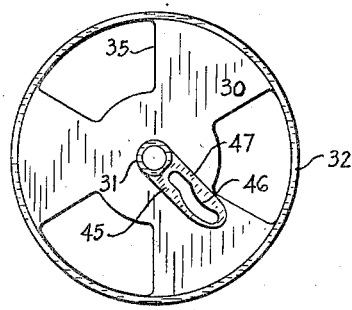
Fig. 6 is a bottom plan view of the lower closure plate.
Figure 10:
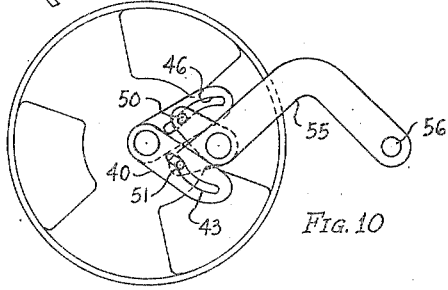
Figure 7:
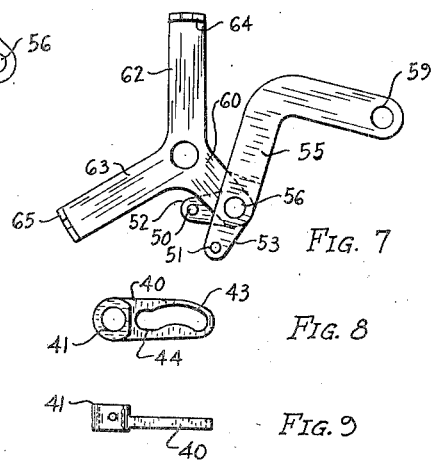
Fig. 7 is a bottom plan detail showing the actuating lever arrangement and mounting member.
Figure 8:
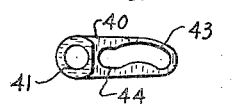
Figs. 8 and 9 are a plan and side view detail of a cam arm for actuating the upper plate.
Figure 9:
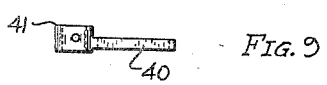
Figure 12:
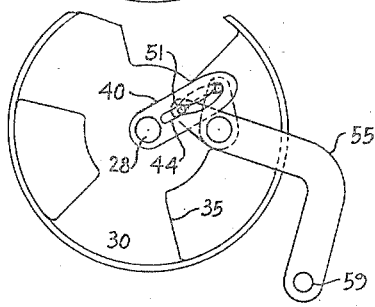

One of the cam actuated projections 51 extends downwardly and into sliding engagement with the cam slot of the arm 40 fixed on the shaft 28 for rotating the upper closure member 20, while the other cam actuating projection 50 on the lever arm 52 projects upwardly into engagement with the cam slot of the cam 45 fixed on the lower closure member 30. Thus, to swing or rotate the upper closure member to both open and close it, while holding the lower member closed, and vice-versa, the following cam operation occurs:

Referring particularly to Figs. 10, 11 and 12 which, as stated, are shown looking upwardly from the bottom of the device, the intermediate position of the handle shows the actuating projections 50 and 51 at the inner ends of the arcuate portions of the cam slots 43 and 46. In this intermediate position both members 20 and 30 are in the position closing the compartment 18. Now, if the handle be swung to the position shown in Fig. 11, the projection 51 swings about the pivot 56 in the arc of the cam slot 43 without moving the cam, and, in fact, while holding the cam arm 40 in the same angular position with top member closed as it was at the start of this movement of the handle, i. e., as in Fig. 10. However, this swinging movement has caused the other projection 50 to swing the counterpart cam 45 through sixty degrees, by engagement with the radial portion 47 of the cam slot on the bottom closure member 30, moving it to open-discharge position.

Swinging the operating handle in the opposite or reverse direction first closes this bottom member 30. Then, on continued movement the projection 51 now moves in the radial portion 44 of the cam arm 40 swinging it and turning the shaft 28, and turning the upper closure 20 through sixty degrees to open it. Return of the handle to the middle position, Fig. 10, again closes the top closure member 30.

It will be seen that the dwell portions of these cams are formed on arcs such that when stationary they are concentric with the fixed pivot 56, and that the inner straight radial portions of the cam slots, when engaged by its actuating projection, will effect a swinging upon the movement of the handle lever.

In each case while one projection is engaging the radial portion of the cam slot and is moving the connected closure member, the other projection is riding idly in the arcuate portion of its cam slot, holding the connected closure member stationary. This holding action is due to the arcuate cam slots closely engaging the pins 50 and 51. This close-fit sliding engagement actually effects a locking action on the connected closure member, in each case, when in its closed position.

It will be seen that, at no time can either closure member be open while the other one is open, and that by moving the handle the upper and lower closure members are alternately moved to both open and close.

It will be noted from inspection of Fig. 12 that when the lower closure member 30 is in the position shown, which is registering with the measuring openings, that the swingable cam arm 40 and lever member 50 are beneath the solid portions of the closure, and that the coffee or other material drops freely past the lever and cam parts. In other words, one of the advantages attained by this unique arrangement of operating cams and levers enables a maximum of opening of the lower closure within the vertically aligned spacing between the lower openings of the measuring compartments.

Summarizing the operation, assuming that loose material, such as coffee, has been stored in the container, which, by the way, is preferably reasonably tight for the protection of the contents, that it is now desired to operate the dispenser. The movement of the handle in one direction will swing the closure parts of the upper closure member to bring its intermediate openings 23 into registration with the measuring compartments 18. This movement, by the way, tends to effectively stir or loosen the lower part of the mass of material and assure free flow into and filling of the measuring compartments.

A simple sixty degree swing of the handle lever in the opposite direction through the first half of its movement rotates the upper closure member to closed position, at which point the actuating projection comes to the arcuate or dwell part of the cam in the arm 40 and there holds the upper closure member in the closed position while the projection moves through the arcuate part of the cam on the further movement of the handle.

The projection 50 having moved through the arcuate portion 46 of the lower closure member cam now engages the radial portion 47 and swings the lower closure 30, through sixty degrees on a continued movement of the handle, through a continued sixty degree half of its movement.

Obviously, a reverse movement of the handle reverses the action just described, closing the bottom of the compartments and opening the top thereof.

At no time can both closures be simultaneously open or even partially open. That is, one closure member must be closed and be there so held while the other closure is being opened.

Having thus described my invention what I claim is:

1. A metering and discharging mechanism comprising a container having a bottom wall, a downwardly extending measuring chamber having a discharge opening and supported by the wall, an oscillating closure above the wall and an oscillating closure for the bottom of the measuring chamber, a shaft forming a common axis for said closures and secured to the upper closure, a cam affixed to the lower closure, a cam affixed to the shaft, each of said cams having a dwell portion and an active portion, an actuating lever pivoted to swing on an axis parallel with the shaft and having relatively fixed projections, one engaging each of said cams, the cams being so shaped that while the projection is moving on the dwell portion of one cam the other projection is acting on the active portion of the other cam.

2. A container having a downwardly extending receptacle and discharge opening, an oscillating closure above the wall for the top of said receptacle and an oscillating closure for the bottom of the same, a shaft forming a common axis for said closures and being attached to the top closure, a cam affixed to the lower closure, a cam affixed to the shaft, each of said cams having a dwell portion and an active portion, an oscillating member pivoted to swing on an axis parallel with the shaft and having actuating projections, one projection engaging each of said cams, the cams being so shaped that while the projection is moving along the dwell portion of one cam the other projection is engaging the active portion of the other cam, whereby one closure is held in either its open or closed position while the other closure is being moved.

3. A measuring and discharging device for loose material comprising a container having a bottom wall with an opening therethrough, depending walls below the opening forming a receptacle, a shaft, a closure secured to the shaft and fitted above and against the bottom wall and adapted to be rotated to uncover and cover the opening, an oscillating closure swingable about the shaft for closing the bottom of the opening forming the receptacle, a pair of cams, each fixed to one of said closures and having radial active portions and arcuate dwell portions, actuating projections fixed to a common actuator pivoted on an axis adjacent the shaft for causing the projections to alternately move in the arcuate portions and actively engage the respective radial portions to actuate the closures, moving one while holding the other stationary.

4. In a device of the character described, the combination of a container having a measuring chamber carried thereby and open at the top and bottom, a pair of rotatable closure members for said chamber, one closing the top and the other the bottom of the measuring chamber, means mounting said closure members to rotate on a common axis, a cam member connected to each closure and each swingable about said axis, an actuator pivoted adjacent to said axis and carrying cam engaging elements in relatively fixed positions, each cam having an arcuate portion concentric with the actuator axis, and each cam having an actuating portion positioned radially of said shaft.

5. In a device of the character described, the combination with a measuring member, a receptacle opening into the chamber, and the chamber having vertical walls and a bottom opening, a pair of oscillating closures for the top and bottom opening of the chamber mounted on a common axis, a pair of cam members mounted to be bodily swingable about the common axis and one of said cams being connected to each closure and each having a radial active surface extending outwardly from the axis and also having an arcuate dwell surface, a pair of actuators engaging the cams and rigidly fixed to move about an axis adjacent to the first-mentioned axis, and the arcuate dwell surface of each cam conforming to an arc whose fixed radius is its distance from the axis of its actuator element.

JACKSON L. CAMPBELL.

REFERENCES CITED

The following references are of record in the file of this patent:

FOREIGN PATENTS

| Number | Country | Date |
|---|---|---|
| 492,032 | Germany | Feb. 20, 1930 |
| 322,089 | Italy | Oct. 27, 1934 |